UNITED STATES PATENT OFFICE.

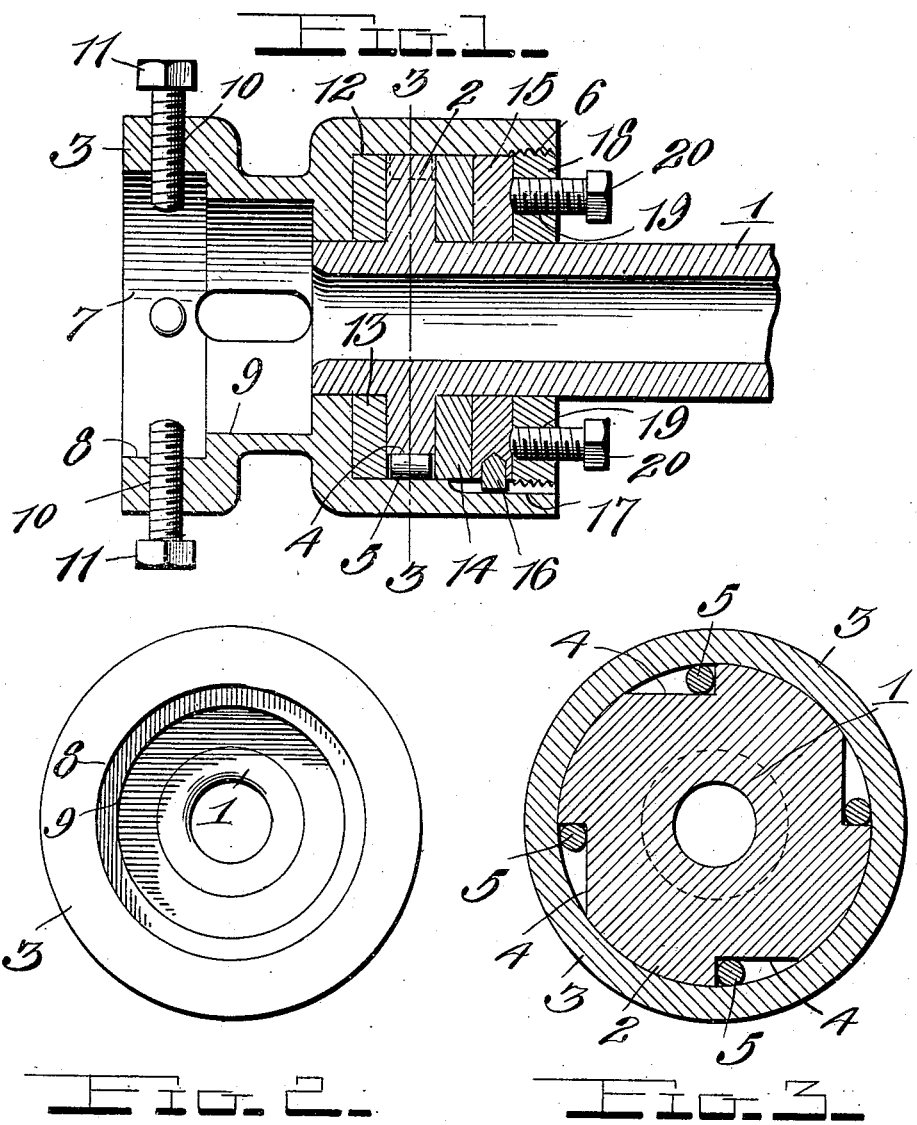

LEE H. ROGERS, OF PARSONS, KANSAS, ASSIGNOR OF ONE-HALF TO WILLIAM A. DALEY, OF ST. LOUIS, MISSOURI.

TAP AND DIE HOLDER.

991,543.  Specification of Letters Patent. Patented May 9, 1911.

Application filed October 3, 1910. Serial No. 585,107.

*To all whom it may concern:*

Be it known that I, LEE H. ROGERS, a citizen of the United States, residing at Parsons, in the county of Labette and State of Kansas, have invented certain new and useful Improvements in Tap and Die Holders, of which the following is a specification, reference being had to the accompanying drawings.

My invention relates to tap or die holders, and has special reference to holders of the class used in machines for drilling, tapping and similar purposes. In machines of this character the chuck holding the drill or tap is rigidly fastened to the driving spindle, and in consequence, when employed for drilling or tapping, it become necessary, as the tap approaches the bottom of the hole, to so regulate the stopping of the machine as to prevent the tap from striking the bottom and receiving the full power transmitted through the spindle, which would result in the breaking of the drill or tap, or if either are of sufficient strength to resist the power, would injure the driving mechanism of the machine or the material on which the work is being done.

One object of my invention is to obviate this difficulty by providing a simple, cheap, and durable tap or die holder, which shall be of sufficient rigidity to transmit or sustain the force required for the performance of the work, but shall yield under an excess of strain, permitting the tool to be driven at full speed until the completion of the work, thus reducing greatly the amount of skill required, and preventing absolutely the breaking of tools or the injuring of either the machine or material.

Another object is to provide a tap or die holder that is constructed so that it may also be made up to be used on drill presses, tapping machines or turret lathes, and when made up in the form of a drill chuck will prevent drills from being broken when choked or clogged with the clippings.

With the above and other objects in view the invention consists in the detail of construction and in the arrangement and combination of parts whereby a tap or die holder is produced which will possess advantages in points of efficiency, durability, and is inexpensive of manufacture, and at the same time being simple in construction and operation.

In the accompanying drawings—Figure 1 is a longitudinal central section view, Fig. 2 is a front end view, Fig. 3 is a cross section taken on the line 3—3 of Fig. 1.

Referring more particularly to the drawings by numerals of reference, 1 indicates a drill spindle or driver having a flange 2 formed thereon near its outer end. Mounted upon the flange 2 and the outer end of the spindle 1 is a hollow body 3 the flange 2 having recesses 4 formed upon its outer face adapted to receive a number of friction rollers 5 to lock the body 3 from rotating backward. The body 3 has a threaded end 6 and its other end terminates in a tap or die holder 7 which is of two different diameters as indicated at 8 and 9 for the reception and accommodation of the tap or die. Screw threaded openings 10 are formed in the outer ends of the holder 7 adapted to receive set screws 11, so that the tap or die will be held in a rigid position. A shoulder 12 is formed within the body 3, and has a washer 13 placed between said shoulder and the inner face of the flange 2. Another washer 14 is placed upon the outer face of the flange 2, and a pressure disk 15 is then placed upon the washer 14, said pressure disk 15 having a locking key 16 adapted to fit into a keyway 17 formed in the inner face of the body 3, so that when disk 15 is pressed down upon the washer 14 forcing the washer against the flange 2 of the spindle 1 it will cause the entire holder to rotate. This disk is forced into the body by means of an adjusting screw disk 18 disposed in the threaded end 6 of the body 3, and is provided with a number of screw threaded openings 19 adapted to receive the adjusting screws 20.

In the operation of my invention the spindle is securely fastened to the machine, and rotates within the body, and to have the holder rotate with the spindle the set screws 20 must be tightened down upon the pressure disk 15 which in turn will force the friction washers against the flange of the spindle and cause the entire body to rotate. The friction may be adjusted so that it overcomes the pulling weight of the thread it is cutting. When the tap is run to the bottom or the die run to the shoulder the machine is then reversed, it requiring more power to start the tap or die from the bottom or shoulder. The lock rollers 5 shown in the recesses 4 of the flange 2 lock the body 3 from rotating backward, thus starting the tap or die from the bottom or shoulders without any jar or shock whatever.

It is noted that various changes may be resorted to for successfully carrying the invention into practice without departing from the scope thereof.

Having thus described the invention what is claimed is:—

1. In a tap or die holder, the combination of a spindle having an annular flange formed thereon, a body to receive said spindle and flange, friction washers arranged on the spindle on opposite sides of the flange, said body having a longitudinally extending key slot, a pressure disk arranged upon the spindle and movable in the end of the body, a key carried by the disk to engage in said slot and prevent independent rotation of the body upon the spindle, and set screws supported in the body and engaging said pressure disk to force the same inwardly and frictionally engage the washers with the opposite faces of said flange.

2. In a tap or die holder, the combination of a spindle having a flange formed thereon, a hollow cylindrical body to receive said spindle and flange, means for securing a tap or die in the body, friction washers arranged on the spindle to engage the opposite faces of the flange, an intermediate annular stop shoulder formed in the body to limit the inward movement of the spindle, a pressure disk movable on the spindle, a disk arranged on said spindle provided with peripheral threads for engagement with internal threads on the end of the body, said latter disk engaging upon the pressure disk, and adjusting screws carried by said threaded disk to engage said pressure disk and force the washers into frictional engagement with the opposite faces of the flange.

3. In a tap or die holder, the combination of a spindle having an annular flange, a hollow body to receive said spindle and flange, washers arranged on opposite sides of the flange for frictional engagement therewith, a pressure disk arranged in the body, means carried by said disk engaging the body to prevent relative rotation of the disk and body, means arranged in the body engaging the pressure disk to force said washers into frictional engagement with the flange of the spindle to secure the body upon the spindle for rotation therewith, and means arranged in the periphery of the flange to positively lock the spindle and body together in the reverse movement of the spindle.

4. In a tap or die holder, the combination of a spindle having an annular flange on one end, a body to receive the spindle and flange, friction washers arranged on the spindle to engage the opposite faces of the flange, means arranged in the body for rotation therewith to force said washers into frictional engagement with the flange and lock the body and spindle together, said flange having a plurality of peripheral recesses, and rollers arranged in said recesses for frictional engagement with the walls thereof and the inner wall of the body to prevent independent rotation of said body in the reverse movement of the spindle.

In testimony whereof I hereunto affix my signature in the presence of two witnesses.

LEE H. ROGERS.

Witnesses:
DAVID HILL,
S. F. JAGGAR.

Copies of this patent may be obtained for five cents each, by addressing the "Commissioner of Patents, Washington, D. C."